United States Patent
Szeto et al.

(10) Patent No.: US 10,288,240 B2
(45) Date of Patent: May 14, 2019

(54) SYSTEM AND METHOD FOR COVERING A FLUORESCENT CEILING FIXTURE WITH A MATRIX OF LED LIGHTS

(71) Applicant: Metaphase Technologies, Inc., Bristol, PA (US)

(72) Inventors: Oliver Szeto, Bristol, PA (US); Gary Sigman, Bristol, PA (US); Kevin High, Bristol, PA (US)

(*) Notice: Subject to any disclaimer, the term of this patent is extended or adjusted under 35 U.S.C. 154(b) by 399 days.

(21) Appl. No.: 15/191,261

(22) Filed: Jun. 23, 2016

(65) Prior Publication Data

US 2017/0370533 A1    Dec. 28, 2017

(51) Int. Cl.
| | |
|---|---|
| F21S 8/04 | (2006.01) |
| F21V 23/02 | (2006.01) |
| F21Y 105/10 | (2016.01) |
| F21Y 115/10 | (2016.01) |

(52) U.S. Cl.
CPC .............. *F21S 8/04* (2013.01); *F21V 23/023* (2013.01); *F21Y 2105/10* (2016.08); *F21Y 2115/10* (2016.08); *Y02B 20/386* (2013.01)

(58) Field of Classification Search
CPC ....................................................... F21S 8/04
See application file for complete search history.

(56) References Cited

U.S. PATENT DOCUMENTS

| | | | |
|---|---|---|---|
| 5,276,591 A | 1/1994 | Hegarty | |
| 6,283,612 B1 | 9/2001 | Hunter | |
| 6,509,840 B2 | 1/2003 | Martineau | |
| 6,739,734 B1 | 5/2004 | Hulgan | |
| 7,794,114 B2 | 9/2010 | Mendendorp, Jr. | |
| 8,066,407 B2 | 11/2011 | Remus et al. | |
| 8,556,458 B2 | 10/2013 | Higuchi et al. | |
| 8,727,566 B1 | 5/2014 | Szeto | |
| 9,206,948 B1 * | 12/2015 | Scribante | F21V 21/03 |
| 9,279,553 B1 * | 3/2016 | Scribante | F21S 8/026 |
| 2002/0028600 A1 | 3/2002 | Kondo | |
| 2007/0211457 A1 * | 9/2007 | Mayfield, III | F21S 8/02 362/223 |
| 2007/0228999 A1 | 10/2007 | Kit | |
| 2008/0253122 A1 | 10/2008 | Hancock et al. | |
| 2009/0046457 A1 | 2/2009 | Everhart et al. | |
| 2009/0278465 A1 | 11/2009 | Farmer et al. | |
| 2010/0091484 A1 * | 4/2010 | Mayfield, III | F21S 8/026 362/223 |
| 2010/0148673 A1 | 6/2010 | Stewart et al. | |
| 2011/0084608 A1 | 4/2011 | Lin et al. | |
| 2011/0121756 A1 | 5/2011 | Thomas et al. | |
| 2012/0161666 A1 | 6/2012 | Anthony et al. | |
| 2012/0176784 A1 * | 7/2012 | Peifer | F21K 9/00 362/217.05 |

(Continued)

*Primary Examiner* — Alexander K Garlen
(74) *Attorney, Agent, or Firm* — LaMorte & Associates, P.C.

(57) ABSTRACT

A system and method of converting a light fixture from a conventional light fixture to an LED light fixture. Originally, the light fixture has a troffer, a ballast unit, and bulb receptacles. The conversion is accomplished by mounting a panel over the face of the troffer that obscures the ballast unit and bulb receptacles. LED light strips are mounted to the panel. Likewise, an LED power supply is mounted to the panel. The panel is attached to the troffer with a hinge connection. In this manner, the panel can be rotated away from the troffer for easy access.

17 Claims, 5 Drawing Sheets

(56) References Cited

U.S. PATENT DOCUMENTS

| | | | |
|---|---|---|---|
| 2013/0265751 A1 | 10/2013 | Edmond et al. | |
| 2014/0160742 A1* | 6/2014 | Rodgers | F21V 23/02 362/222 |
| 2014/0168961 A1* | 6/2014 | Dubord | F21V 21/14 362/225 |
| 2015/0267873 A1* | 9/2015 | Price | F21V 21/03 362/235 |
| 2015/0276125 A1* | 10/2015 | Pratt | F21S 2/005 362/217.15 |
| 2016/0102825 A1* | 4/2016 | Scribante | F21S 8/022 362/217.12 |

* cited by examiner

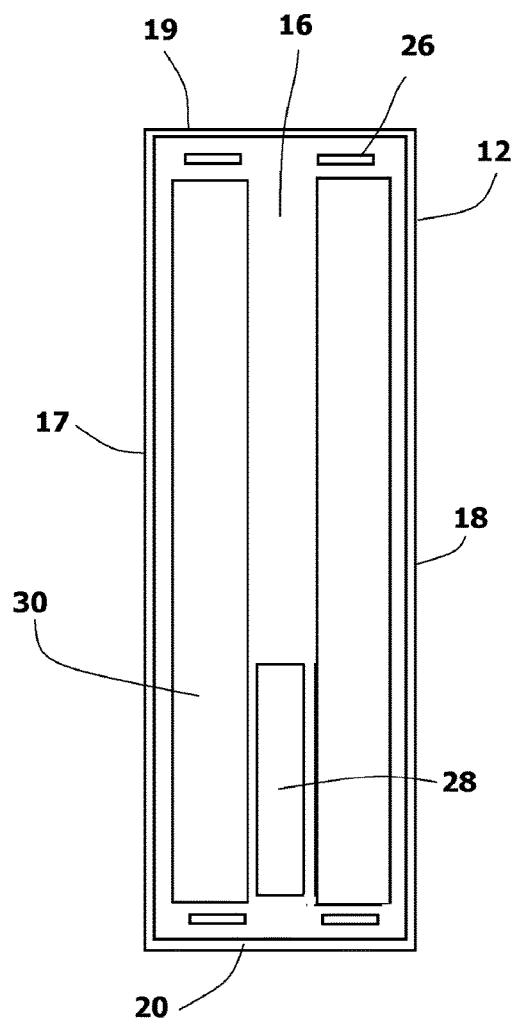 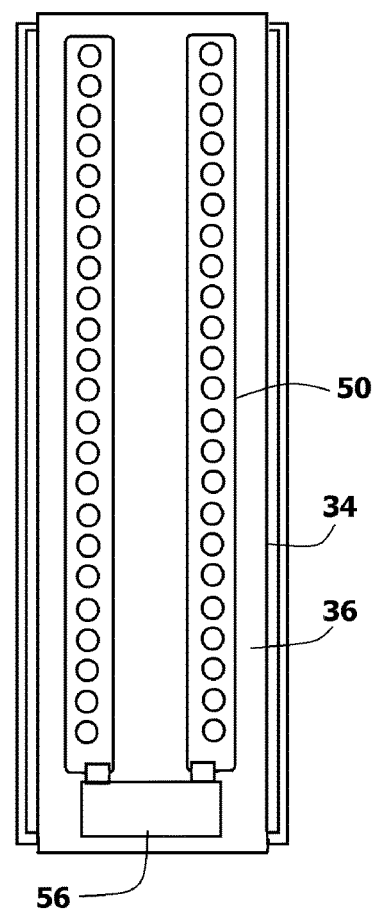
FIG. 6
PRIOR ART
FIG. 7

SYSTEM AND METHOD FOR COVERING A FLUORESCENT CEILING FIXTURE WITH A MATRIX OF LED LIGHTS

BACKGROUND OF THE INVENTION

1. Field of the Invention

In general, the present invention relates to ceiling/overhead lighting fixtures that utilize sheet metal troffers. More particularly, the present invention relates to systems and methods that retroactively add LED lights to the structure of a lighting fixture that previously held a fluorescent bulb or an incandescent bulb.

2. Prior Art Description

Light emitting diodes (LEDs) are becoming more powerful with each successive generation. At the same time, the costs associated with manufacturing LEDs has been decreasing. LEDs have now evolved to a point where a small matrix of LEDs can produce just as much light as an incandescent bulb or a fluorescent bulb. As an example, a small matrix of LEDs that uses less than ten watts during operation can give off more light than a 100-watt incandescent bulb or a 40-watt fluorescent tube.

LEDs are far more energy efficient than either incandescent bulbs or fluorescent bulbs. Furthermore, LEDs have a much longer life span and are far more resistant to damage than are incandescent bulbs and fluorescent bulbs. For these reasons, many companies would like to replace traditional incandescent light bulbs and fluorescent bulbs with LED lighting. However, a problem that occurs is that in many offices, the ceiling/overhead lighting fixtures are configured to only utilize fluorescent tube bulbs.

Typically, ceiling/overhead fixtures are either set into the structure of drop ceiling tiles or are suspended from the structure of the ceiling. The fixtures typically have sheet metal troffers that receive and hold florescent tubes. In order to replace the florescent tubes with LED lights, either the ceiling/overhead fixtures have to be replaced, or the ceiling/overhead fixtures have to be modified to receive and power a matrix of LEDs.

Replacing existing ceiling/overhead fixtures is a very expensive and labor intensive endeavor that may require the ceiling tiles surrounding the troffers be replaced. This solution is very expensive and it would take many years for the cost savings of the LED lights to pay for the cost of the lighting change. As a consequence, outside of new construction, there is no commercially significant market for LED lighting fixtures that replace fluorescent tube troffers.

An alternative approach is to convert existing fluorescent ceiling troffers into receptacles for LED matrices. However, this also requires a significant amount of time and labor. In order to convert a fluorescent light troffer into an appropriate LED receptacle, certain modifications of the troffer must be made. Using prior art conversion systems, first the ballast unit and supply wiring within the troffer are removed. Second, the bulb receptacles that hold the fluorescent tube bulbs are removed. Third, the reflectors for the florescent lights are removed from the troffer.

Removing the bulb receptacles, the ballast unit and the reflectors from a lighting fixture can adversely affect the aesthetics of the lighting fixture. The removal of the components leaves openings in the sheet metal of the troffer and discolored areas along the troffer. Often a florescent lighting fixture looks damaged or incomplete after it is converted to LED lights. Consequently, many companies that would like to convert to LED lighting do not find it aesthetically pleasing or cost effective to change from the existing fluorescent tube lighting to LED lighting.

A need therefore exists for a system and method of converting a fluorescent light ceiling fixture into an LED fixture at a lower cost, using less labor and creating a more aesthetically pleasing end product. These needs are met by the present invention as described and claimed below.

SUMMARY OF THE INVENTION

The present invention is a system and method of converting a light fixture from a conventional light fixture into an LED light fixture. Originally, the light fixture has a troffer, a ballast unit, and bulb receptacles for retaining either fluorescent or incandescent bulbs. The conversion is accomplished in the following manner.

Any florescent or incandescent bulb is removed. A new panel is then mounted over the face of the troffer. The panel obscures the sight of elements within the troffer, such as the ballast unit and bulb receptacles. However, the original components are left intact and in place. LED light strips are mounted on the panel that faces away from the troffer. A power supply for the LED light strips is also mounted to the panel. The power supply is wired to the power cable that previously led to the ballast unit within the troffer.

The panel is mounted to the troffer with a hinge connection. The hinge connection enables the panel to be rotated away from the troffer. This provides easy access to the LED light strips and power supply, especially if the troffer is in a high location. The hinge connection is created by first mounting a catch plate to the side of the troffer. The panel has hook elements that engage the catch plate and create the hinge connection.

BRIEF DESCRIPTION OF THE DRAWINGS

For a better understanding of the present invention, reference is made to the following description of an exemplary embodiment thereof, considered in conjunction with the accompanying drawings, in which:

FIG. 6 is a bottom view of a prior art light fixture; and

FIG. 7 is a bottom view of a converted light fixture.

DETAILED DESCRIPTION OF THE DRAWINGS

Although the present invention system can be used in converting a wide variety of fluorescent light fixtures, the embodiment illustrated shows the system being used to retrofit a traditional two-tube florescent light fixture. Such an embodiment is selected in order to set forth one of the best modes contemplated for the invention. The illustrated embodiment, however, is merely exemplary and should not be considered a limitation when interpreting the scope of the appended claims. It will be understood that the present invention can be applied to light fixtures that hold four, six, eight or any number of fluorescent bulbs. Likewise, the present invention can be applied to light fixtures that hold fluorescent tubes of any length or tube type.

Figure 1:
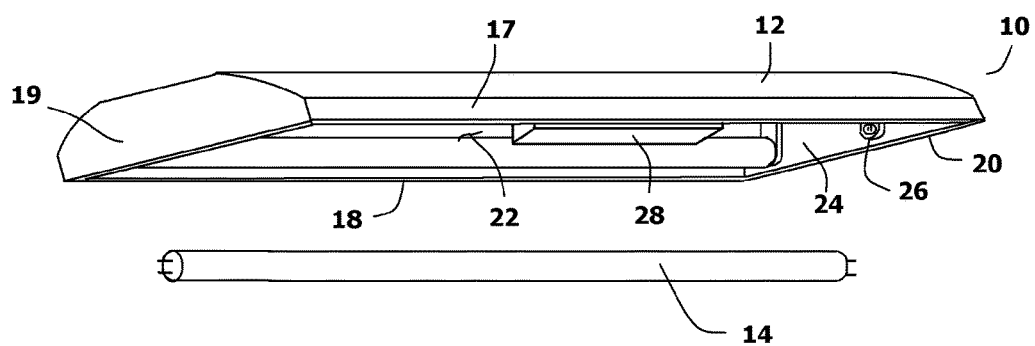
FIG. 1 is a perspective view of a prior art light fixture having a sheet metal troffer.
Figure 2:
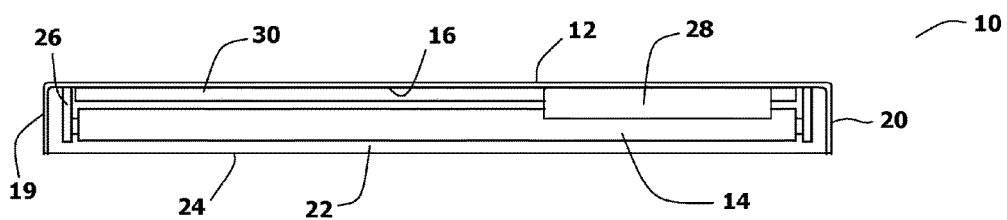
FIG. 2 is a cross-sectional view of the prior art light fixture of FIG. 1.

Referring to FIG. 1 in conjunction with FIG. 2 and FIG. 6, a traditional overhead florescent light fixture 10 is shown. The light fixture 10 has a troffer 12. The troffer 12 can be shaped to be inset within ceiling tiles or may hang from a ceiling mount. The troffer 12 is typically made of sheet metal. The light fixture 10 may be sized to hold any number of fluorescent tube bulbs 14, with the most common sizes holding two, four or eight fluorescent tube bulbs. In the shown embodiment, the troffer 12 is sized to hold two fluorescent tube bulbs 14 for the purpose of simplicity and clarity of description.

The troffer 12 has a bottom surface 16 that is surrounded by four peripheral walls. The four peripheral walls include two long walls 17, 18 and two short walls 19, 20. The bottom surface 16 and peripheral walls 17, 18, 19, 20 define an interior 22. The interior 22 is accessible through an open face 24 that opens toward the area that is to be illuminated. Located within the interior 22 of the troffer 12 are the bulb receptacles 26 that receive the ends of the florescent tube bulbs 14. There are two bulb receptacles 26 for each florescent tube bulb 14 that is received within the troffer 12. Also, mounted within the interior 22 of the troffer 12 is a ballast unit 28. The ballast unit 28 conditions the current that powers the florescent tube bulbs 14 through the bulb receptacles 26. Lastly, reflectors 30 are typically mounted to the bottom surface 16 of the troffer 12 within the interior 22 of the troffer 12. The reflectors 30 are positioned between the florescent tube bulbs 14 and the bottom surface 16 of the troffer 12 to help direct light out of the interior 22 of the troffer 12.

The interior 22 of the troffer 12 is deep enough to hold the florescent tube bulbs 14, the bulb receptacles 26, the ballast unit 28 and the bulb reflectors 30 without any of these components extending beyond the open face 24 of the troffer 12. In this manner, a diffuser panel (not shown) can be mounted over the open face 24 of the troffer 12 in a flush manner.

Figure 3:
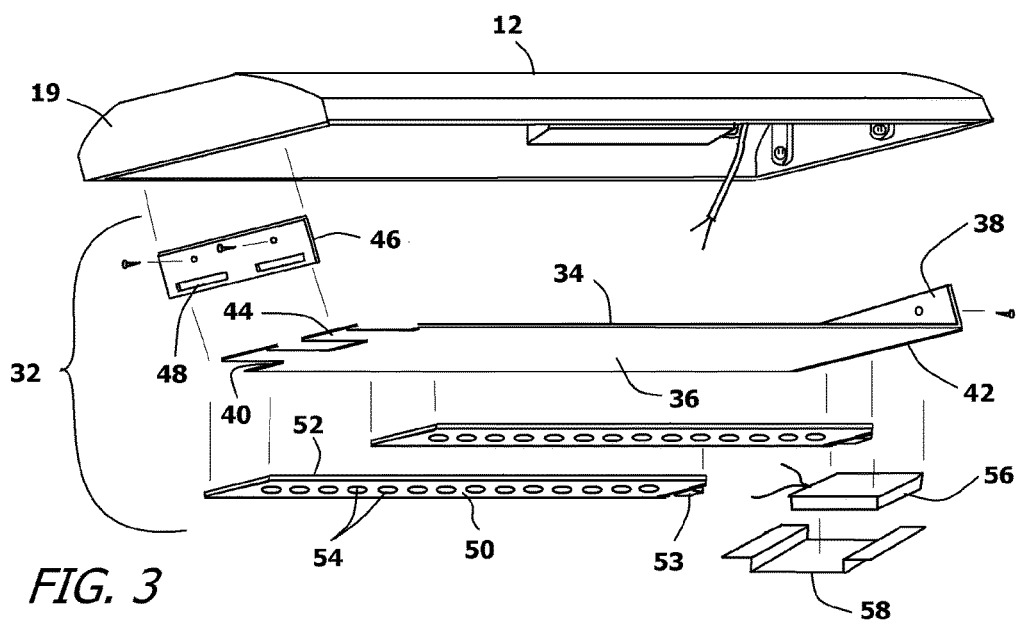
FIG. 3 is an exploded perspective view of a converted light fixture that includes a conversion system applied to a prior art light fixture.

Referring to FIG. 3, the components of the present invention conversion system 32 are shown. The conversion system 32 utilizes a main mounting structure 34. The mounting structure 34 is generally L-shaped and has a long face panel 36 and a short side panel 38 that extends at a perpendicular from one end of the long face panel 36. The length of the long face panel 36 is between ⅛th of an inch and ¼ of an inch longer than the length of the troffer 12. The long face panel 36 has a first end 40 and an opposite second end 42. The first end 40 is free. The second end 42 meets the short side panel 38 at a corner. Hook elements 44 are formed into the long face panel 36 at its free end 40.

A catch plate 46 is also provided as a separate element. The catch plate 46 is a small plate that is smaller than the short wall 19 of the troffer 12. One or more catches 48 are formed in the catch plate 46. The catches 48 are shown as slotted holes. However, it will be understood that deep depressions, eyelets, or any other structure that can be engaged by the hook elements 44 on the long face panel 36 can also be used.

Light strip assemblies 50 are provided. Each light strip assembly 50 includes a long substrate 52 upon which are mounted a plurality of light emitting diodes 54. The length of each light strip assembly 50 is generally the same length as the florescent tube bulbs 14 for which the troffer 12 was originally designed to hold. Any number of LEDs 54 can be mounted onto each substrate 52. Likewise, the LEDs 54 can be white LEDs, colored LEDs or any combination thereof. The wiring for the various LEDs 54 is printed onto the substrates 52 of the light strip assemblies 50. The wiring terminates at an electrical connector 53 that is positioned at one end of each of the light strip assemblies 50.

A power supply 56 is provided, as is a power supply cover 58. The power supply 56 interconnects with the supply wiring within the troffer 12 that was disconnected from the ballast unit 28. The power supply 56 converts the electricity to direct current for use by the LEDs 54 on the light strip assemblies 50. The power supply cover 58 is an aesthetic cover that hides the appearance of the power supply 56.

Figure 4:
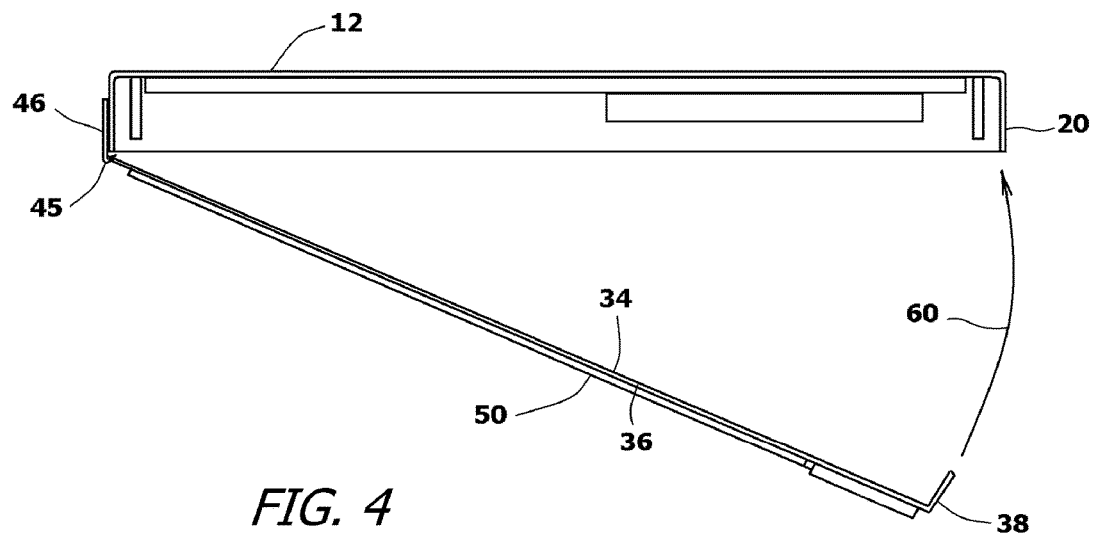
FIG. 4 is a cross-sectional view of a converted light fixture with the mounting structure swung to an open position.
Figure 5:
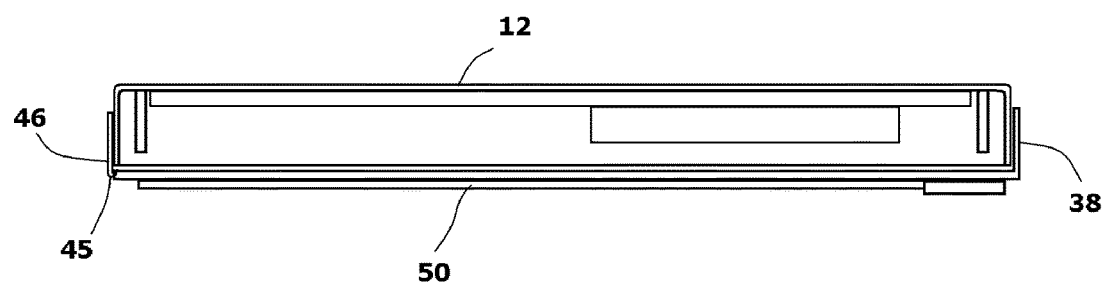
FIG. 5 is a cross-sectional view of a converted light fixture with the mounting structure swung to a closed position.

Referring to FIG. 2, in conjunction with FIG. 3, FIG. 4 and FIG. 5, the methodology of converting a florescent light fixture into an LED light fixture can be explained. Beginning with the original florescent light fixture 10, the florescent tube bulbs 14 are removed. The remainder of the florescent light fixture 10 is left as is. The bulb receptacles 26, reflectors 30 and ballast unit 28 are all left in place.

The catch plate 46 is attached to a short wall 19 of the troffer 12 using a mechanical connector, such as rivets or sheet metal screws. The catch plate 46 is attached so that the catches 48 extend just beyond the open face 24 of the troffer 12.

The mounting structure 34 is attached to the troffer 12. This is done by engaging the hook elements 44 on the long face panel 36 with the catches 48 at the free first end 40 of the long face panel 36. As the hook elements 44 engage the catches 48, a hinge connection 45 is created. The hinge connection 45 enables the mounting structure 34 to swing freely along the curved path shown by arrow 60 in FIG. 4.

The mounting structure 34 can be rotated toward the troffer 12 until the short side panel 38 of the mounting structure 34 is adjacent to the short side wall 20 of the troffer 12. In this position, the long face panel 36 is parallel to the plane of the open face 24 of the troffer 12. The short side panel 38 of the mounting structure 34 can be affixed to the short wall 20 of the troffer 12 using a mechanical fastener, such as a rivet or sheet metal screw.

Referring to FIG. 6 and FIG. 7, it will be understood that once the mounting structure 34 is affixed to the troffer 12, the long face panel 36 of the mounting structure 34 covers the bulb receptacles 26, the reflectors 30 and the ballast unit 28 within the interior 22 of the troffer 12. These unused components are therefore mostly shielded from sight. No time or labor is expended in the removal of these components. Rather, these components are merely covered over by the mounting structure 34.

Returning to FIGS. 3, 4 and 5, it can be seen that the light strip assemblies 50 are attached to the long face panel 36 of the mounting structure 34. This can be accomplished using magnets, tape, adhesive and/or screws. Likewise, the power supply 56 and the power supply cover 58 are also mounted to the long face panel 36 of the mounting structure 34. The light strip assemblies 50 are interconnected to the power supply 56 so that they receive electricity through the power supply 56. The attachment of the various elements to the long face panel 36 of the mounting structure 34 can be accomplished while the mounting structure 34 is hanging down from its hinge connection with the catch plate 46. This makes accessing the components much easier. Once all the components are attached to the mounting structure 34, the mounting structure 34 can be rotated up into its operational position over the open face 24 of the troffer 12.

The mounting structure 34 is preferably fabricated from sheet metal. The metal of the mounting structure 34 acts as a heat sink that absorbs heat from the light strip assemblies 50 and transfers that heat to the sheet metal of the mounting structure 34 and then to the metal of the troffer 12. Due to the large surface area of the mounting structure 34 in relation to the relatively small area of the light strip assemblies 50, enough heat is transferred to keep the light strip assemblies 50 within their operating temperature specifications even during the most unfavorable ambient conditions.

Once the light strip assemblies 50 are installed, the overall lighting fixture is now an LED lighting fixture. If a diffuser is desired, diffusers can be provided that attach either over the light strip assemblies 50 or over the entire face panel of the mounting structure 34.

With reference to all figures, it will now be understood that the methodology of converting a preinstalled fluorescent light fixture to an LED light fixture involves the following steps. Step one, remove the florescent tube bulbs 14 from the light fixture. Step two, disconnect the incoming power wires from the ballast unit 28. Step three, install the catch plate 46 to the short side wall 19 of the troffer 12. Step four, attach the mounting structure 34 to the catch plate 46. Step five, attach the light strip assemblies 50 and new power supply 56 to the mounting structure 34 and to one another. Lastly, rotate the mounting structure 34 against the open face 24 of the troffer and lock in place. The conversion is simple and requires nothing more than a screwdriver to turn a few mounting screws. The result is a system that is both inexpensive to manufacture and easy to install.

The cost and labor advantages also extend to repairs. If any light strip assembly 50 were to fail once installed, a repair can be rapidly made without the use of any tools other than a screwdriver. The mounting structure 34 is merely rotated down and the broken light strip assembly either repaired or replaced. Accordingly, a broken light fixture can be rapidly repaired with only a small effort of labor.

The ability to mount light strip assemblies 50 directly to the mounting structure 34, also enables a user to customize the light emitted by a particular light fixture. Any plurality of light strip assemblies 50 can be adhered to the mounting structure 34, provided there is space available. Accordingly, the light fixture can be made as bright or as dim as desired. Through the power supply 56, dimming of the LEDs becomes possible using a dimmer switch or other dimmer control. Such control cannot be readily achieved with fluorescent tubes. Furthermore, light strip assemblies 50 with colored LEDs can be added to a light fixture to tint or soften the light being emitted.

It will be understood that the embodiment of the present invention that is illustrated and described is merely exemplary and that a person skilled in the art can make many variations to that embodiment. For instance, the length and number of light strip assemblies 50 can be varied, as can the number and type of LEDs 54. All such embodiments are intended to be included within the scope of the present invention as defined by the claims.

What is claimed is:

1. A method of converting a light fixture from a fluorescent light fixture to an LED light fixture, wherein the fluorescent light fixture has a troffer with an interior defined by peripheral walls, a ballast unit, and bulb receptacles for retaining fluorescent tube lights, said method comprising the steps of:
    removing said fluorescent tube lights from said interior of said troffer and leaving said bulb receptacles and said ballast unit within said interior of said troffer;
    mounting a catch plate to one of said peripheral walls of said troffer;
    providing an L-shaped mounting structure that has a long face panel and a short face panel that is perpendicular to said long face panel, wherein said long face panel has a first free end, wherein said first free end of said mounting structure selectively connects to said catch plate at a hinge connection;
    mounting at least one light strip assembly to said long face panel of said mounting structure;
    mounting a power supply to said mounting structure, wherein said power supply provides electricity to said at least one light strip;
    rotating said mounting structure about said hinge connection to a position that covers said ballast unit and said bulb receptacles within said interior of said troffer; and
    connecting said mounting structure to said troffer when in said position to retain said mounting structure in said position.

2. The method according to claim 1, wherein said at least one light strip assembly has a plurality of LEDs mounted thereon.

3. The method according to claim 1, further includes the step of providing hook elements on said first free end of said long face panel.

4. The method according to claim 1, wherein said catch plate has catches formed thereon for engaging said hook elements on said mounting structure and creating said hinge connection between said catch plate and said hook elements.

5. The method according to claim 1, wherein connecting said mounting structure to said troffer when in said position includes connecting said short face panel to said troffer with a mechanical connector.

6. The method according to claim 1, wherein said troffer has an open face and said long face panel extends across said open face of said troffer when in said position.

7. A method of converting a light fixture for bulbs into an LED light fixture, wherein the light fixture has a troffer, a ballast unit and bulb receptacles for retaining bulbs, said method comprising the steps of:
    providing an L-shaped panel having a long face and a short face, wherein said long face has a free first end;
    mounting said panel over said troffer so that said ballast unit and said bulb receptacles are positioned between said troffer and said panel;
    mounting LED light strips to said panel;
    mounting a power supply for said LED light strips to said panel.

8. The method according to claim 7, wherein mounting said panel over said troffer includes connecting said first end of said panel to said troffer with a hinge connection and rotating said panel about said hinge connection to position said panel over said ballast unit and said bulb receptacles.

9. The method according to claim 8, further including a step of mounting a catch plate to said troffer, wherein said panel engages said catch plate with said hinge connection.

10. The method according to claim 9, further including the step of providing hook elements at said first end of said panel.

11. The method according to claim 10, wherein said catch plate has catches formed thereon for engaging said hook elements on said panel and creating said hinge connection.

12. The method according to claim 8, wherein said troffer has a first length that extends between a first side and a second side, wherein said plate extends across said length and is coupled to both said first side and said second side.

13. A lighting fixture, comprising:

a troffer having a bottom surface and peripheral walls that define an interior, wherein said interior of said troffer is accessible through an open face;

bulb receptacles extending into said interior of said troffer from said bottom surface;

an L-shaped panel having a long face and a short face joined at a perpendicular, wherein said long face of said panel extends over said open face of said troffer and positions said short face outside of side troffer, wherein said long face and said short face of said panel are both mechanically connected to said troffer;

a light strip mounted to said long face of said panel that faces away from said troffer; and a power supply mounted to said panel for powering said light strip.

14. The light fixture according to claim 13, wherein components for florescent tube bulbs are mounted within said interior of said troffer, wherein said components are selected from a group consisting of reflectors and ballast units.

15. The light fixture according to claim 13, wherein said long face of said panel is coupled to said troffer with a hinge connection.

16. The light fixture according to claim 15, further including a catch plate mounted to said troffer, wherein said long face of said panel engages said catch plate with said hinge connection.

17. The light fixture according to claim 13, wherein said light strip contains a plurality of LEDs thereon.

* * * * *